May 23, 1967

R. F. HIGH ETAL 3,320,972

PROSTHETIC TRICUSPID VALVE AND METHOD OF AND DEVICE
FOR FABRICATING SAME

Filed April 16, 1964

INVENTORS,
ROY F. HIGH
KENNETH E. WOODWARD

BY

May 23, 1967  R. F. HIGH ETAL  3,320,972
PROSTHETIC TRICUSPID VALVE AND METHOD OF AND DEVICE
FOR FABRICATING SAME
Filed April 16, 1964  2 Sheets-Sheet 2
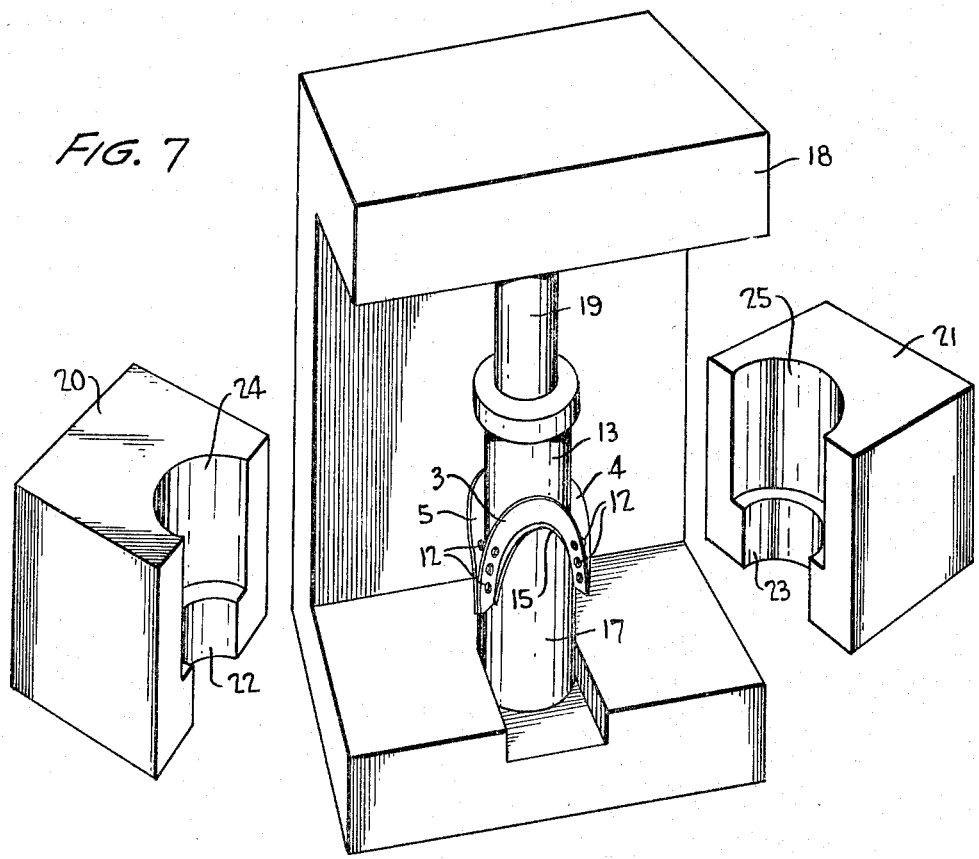
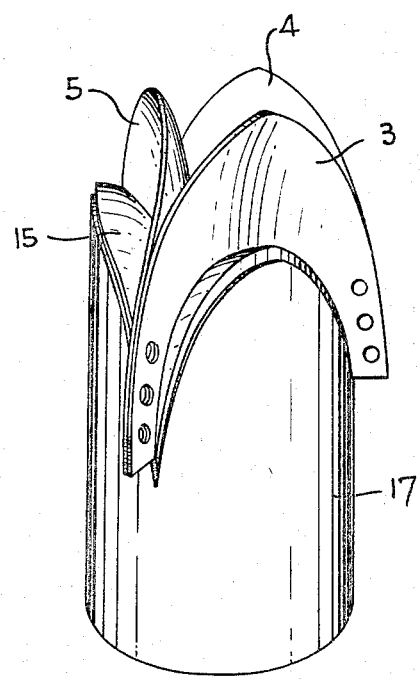
INVENTORS,
ROY F. HIGH
KENNETH E. WOODWARD United States Patent Office 3,320,972
Patented May 23, 1967

3,320,972
PROSTHETIC TRICUSPID VALVE AND METHOD OF AND DEVICE FOR FABRICATING SAME
Roy F. High, Washington, D.C., and Kenneth E. Woodward, McLean, Va., assignors to the United States of America as represented by the Secretary of the Army
Filed Apr. 16, 1964, Ser. No. 360,459
4 Claims. (Cl. 137—525.1)

The invention described herein may be manufactured and used by or for the Government of the United States of America for governmental purposes without the payment to us of any royalty thereon.

This invention relates generally to valves, and more particularly to prosthetic tricuspid valves for use in blood pumps such as those used to maintain circulation during open heart surgery and to the method and the device for fabricating a prosthetic tricuspid valve.

The development of blood pumps has been accompanied by many corollary problems. Chief among these has been the design and fabrication of inflow and outflow valves, corresponding to the mitral and aortic valves in the human heart. Several types of valves have been used for this application with varying degrees of success. Of these the simplest is perhaps the single leaflet or unicusp valve. This valve opens well but has been found to be slow in closing thereby permitting a substantial and undesirable reflux caused by the relatively high head pressure of the pump system. The bicuspid valve, with the margins of the leaflets equal to the diameter of the circle enclosing them, cannot open unless stretching of the leaflets or shortening of the diameter of the circle enclosing the leaflets occurs. This necessarily involves a considerable amount of mechanical stress and strain to the valve and materially contributes to shortening the life of the valve. Additionally, the bicuspid valve requires supporting structures to prevent collapsing under pressure. The iris diaphragm valve, which may be constructed with two or more leaflets, overcomes many of the disadvantages of the bicuspid valve; however, strength and efficiency are directly proportional to the number of leaflets thus making this a rather complex valve. Like the bicuspid valve, the iris diaphragm valve requires supporting structures to prevent collapsing under pressure. Perhaps the most long lived and efficient valve in use is the familiar ball valve. Although bulky, this valve opens and closes quickly. It suffers the serious disadvantage of creating significant turbulence in the bloodstream in both systole and diastole, and turbulence is believed to be a major cause of damage to red blood cells. The human heart has tricuspid valves which have the advantages of unobstructed flow at low pressure and the ability to close rapidly with minimum turbulence and minimum damage to red blood cells. Several attempts have been made to simulate the structure of the tricuspid heart valves. Some of these have resulted in workable tricuspid approximations but involving rather complex structures. Others have produced valves which, while not so complex, have been too short lived and unreliable to be useful for the critical application to a blood pump.

Perhaps the biggest obstacle in the design and production of tricuspid valves is the method of fabrication of the valve. A true tricuspid valve is neither simple nor complex. Basically, a tricuspid valve may be described as having three leaflets, each having a spheroidal shape, within a cylindrical housing. The leaflets are self-supporting and require no accessory structures for support. One method which has been used in the manufacture of a true tricuspid valve employed a polished male tricuspid form. Successive coats of an elastomeric solution were painted over the form until the desired thickness was obtained, and this thickness could only be approximated. The valve was then removed from the form and the leaflets cut apart. This process suffers from several disadvantages: it is difficult to achieve a satisfactory uniformity of thickness; it is a time consuming process; and the physical cutting apart of the leaflets causes areas of strain which eventually cause mechanical fatigue and failure thereby limiting the life of the valve.

It is therefore an object of this invention to provide a valve which opens and closes rapidly under the influence of fluid pressure while creating a minimum turbulence in the fluid flow.

It is another object of the present invention to provide a valve which is relatively simple and compact and which operates without significant stress or strain to the structure of the valve.

It is a further object of the invention to provide a tricuspid valve which closely simulates a human heart valve and which has a long and reliable operating life.

It is still another object of this invention to provide a method of fabricating tricuspid valves which produces a superior valve with a considerable saving in time and labor.

It is yet another object of the instant invention to provide apparatus for the precision fabrication of tricuspid valves which is simple to use.

According to the present invention, the foregoing and other objects are attained by providing a prosthetic tricuspic valve having a cylindrical housing and three spheroidally shaped tricuspid leaflets of a thin, pliable and elastic material integrally joined to the housing. The valve is fabricated by cutting three cuspid leaflets from a thin film of pliable, elastic material according to a predetermined pattern, attaching the three leaflets together, inserting the attached leaflets between male and female molds having spheroidal surfaces, heating the male mold thereby forming the leaflets into spheroidal shapes, and casting a resin mixture around the outer edges of the attached and formed leaflets.

The specific nature of the invention, as well as other objects, aspects, uses and advantages thereof, will clearly appear from the following description and from the accompanying drawings in which:

FIG. 6 is a view of the attached leaflets inserted into the female mold just prior to forming the leaflets into spheroidal shapes; and FIG. 7 is a view of the leaflets in the device for fabricating the tricuspid valve just prior to the casting operation.

Figure 1:
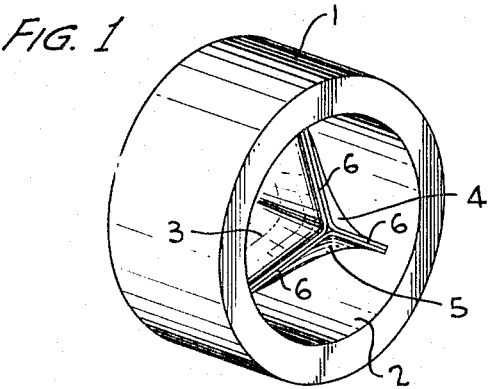
FIG. 1 is a view of the prosthetic tricuspid valve according to the invention showing the outlet end of the valve.
Figure 2:
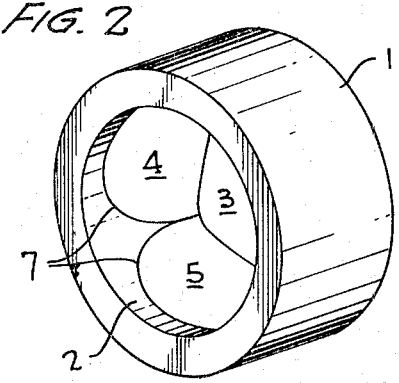
FIG. 2 is another view of the prosthetic tricuspid valve showing the inlet end of the valve.

Referring now to the drawings and more particularly to FIGS. 1 and 2, the prosthetic tricuspid valve according to the invention is shown as comprising a housing 1 having a cylindrical bore 2 therethrough. Three spheroidally shaped leaflets 3, 4 and 5 are integrally joined to housing 1 in the cylindrical bore 2 along lines 7 shown in FIG. 2. The lips of the leaflets 3, 4 and 5 are shown in sealing engagement along lines 6 in FIG. 1. The housing and leaflets of the prosthetic tricuspid valve are preferably made of synthetic elastomers, such as for example polyurethanes, silicones, and acrylics. Leaflet thicknesses of about ten mils have been found to be satisfactory when made of these materials. The selection of the elastomer is based on four important mechanical characteristics. These are strength, pliability, elasticity, and mass. Since the valve has its primary application in blood pumps and can easily be replaced after each use, biological considerations are not as important as the required mechanical characteristics. Polyurethane elastomers have the required strength to withstand tension, fatigue, and tear forces thus providing a long life expectancy for the valve. Silicone elastomers are generally low in tensile and tear strength; however, this weakness is improved by reinforcement with knitted Dacron fabrics. The life expectancy is further enhanced by making the valve housing flexible which tends to reduce the tear forces along the junctions of the leaflets to the housing. These materials are quite pliable allowing the shape of the leaflets to be easily influenced by the forces acting on them. Each leaflet conforms to the engaging lips of the other leaflets and also to the wave form generated in the pulsating blood stream. This is particularly critical in the outflow or aortic valve which is effected by a wide range of cyclic increases in velocity of the stream. An unyielding material would break the fluid wave front and produce undesirable turbulence. Besides being pliable these materials have desirable qualities of elasticity which permit the leaflets to absorb and damp the shock of closure. Additionally, these materials have a density similar to blood making the inertial lag negligible thereby permitting rapid opening and closing of the valve. Should it be desirable to use the valve on a long term basis such as an implant, biological considerations become important. The polyurethane elastomers have been found to be somewhat unsatisfactory for this application; however, other Dacron reinforced elastomers appear to be quite satisfactory. Obviously, other materials having similar characteristics may be used.

Figure 3:
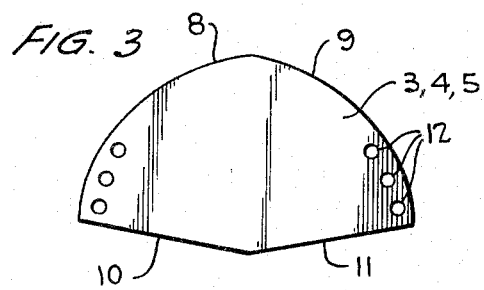
FIG. 3 is a plan view of one of the leaflets used in the valve.

The method by which the valve shown in FIGS. 1 and 2 is fabricated may best be understood with reference to the remaining figures. FIG. 3 shows a single leaflet 3, 4 or 5 which may be cut from a film of an elastomer in any suitable manner. For example, a die may be prepared and the leaflets simply stamped out. The arcuate edges 8 and 9 will eventually be integrally joined to the valve housing. Straight edges 10 and 11 will be the matching lips of the leaflets. Since the jagged and rough edges produced by the cutting or stamping operation have a tendency to cause coagulation of the blood along the edges, it is necessary to smooth and round the straight edges 10 and 11. This is accomplished by dipping the edges in an unreacted catalyzed elastomeric solution, air drying the dipped edges for about 30 minutes and then curing the edges for four hours at the proper temperature. The small holes 12 along the periphery of the arcuate edges 8 and 9 near their respective intersections with straight edges 10 and 11 are for the purpose of providing a better bond between the valve housing and the leaflets.

Figure 5:
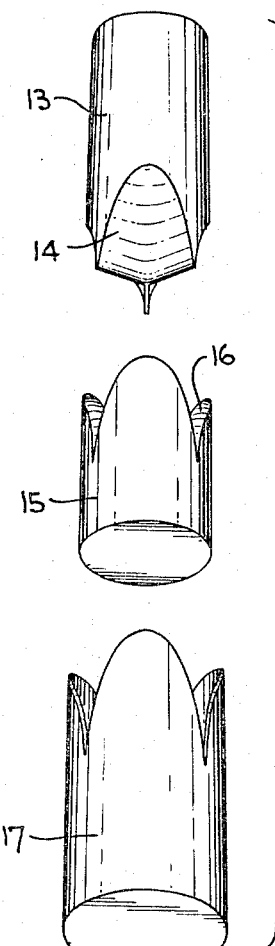
FIG. 5 is an exploded view of the molds used to form the leaflets into spheroidal shapes.
Figure 4:
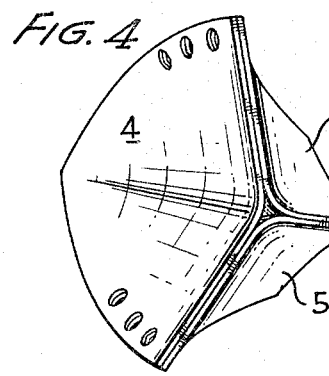
FIG. 4 is a view of three leaflets attached prior to being formed into spheroidal shapes.

After the individual leaflets are prepared, three are attached together near the intersections of the arcuate edges with the straight edges using an elastomeric solution as an adhesive as shown in FIG. 4. This is done to facilitate placing and positioning the leaflets into the male and female molds which are used to form the leaflets into spheroidal shapes. As shown in FIG. 5 the metallic male mold 13 has three concave spheroidal surfaces 14. The female mold is a composite of a metallic shell 17 which holds and supports a silicon rubber insert 15. The insert 15 has three convex surfaces 16 which mate with the surfaces 14. The insert 15 is made by casting room-temperature vulcanized silicon rubber against a master male mold, allowing a 5 mil clearance between the mating surfaces thereby accommodating the thickness of the leaflets. The rubber insert provides two distinct advantages. Leaflets ranging in thickness from 2 to 10 mils may be used while still preventing seepage around the mated edges. Furthermore, pinching, crimping, or cutting of the leaflets along the mating edges is prevented while the leaflets are formed and held in position for the casting of the valve housing.

The attached leaflets 3, 4 and 5 are positioned in the female mold 15, 17 with the arcuate edges extending outwardly as shown in FIG. 6. The male mold is then heated and mated with the female mold. This causes the leaflets to assume the spheroidal shapes of the mating surfaces of the male and female molds. The assembly is allowed to cool after which the extending arcuate edges of the leaflets are carefully cemented together at the mating corners and painted around the entire junction between the male and female molds with an elastomeric solution. The painted edges are allowed to dry for about thirty minutes.

As is shown in FIG. 7, male and female mold assembly 13 and 15, 17 with the leaflets 3, 4 and 5 clamped in position between the male mold and the female mold is held by any suitable device which may for example be C block 18 and adjustable rod 19. The rod 19 may for example be screw adjustable or spring loaded. The split valve housing mold comprises sections 20 and 21. These are placed around the male and female mold assembly 13 and 15, 17, the cylindrical surfaces 22 and 23 of sections 20 and 21, respectively, making mating contact with the element 17 of the female mold. The cylindrical surfaces 24 and 25 of sections 20 and 21, respectively, define a cavity in which the exposed arcuate edges of leaflets 3, 4 and 5 are disposed. It is into this cavity that an elastomeric resin is poured which when cured forms the valve housing. As previously mentioned, the holes 12 in the leaflets 3, 4 and 5 permit a superior bond of the leaflets in the cast valve housing.

It will be apparent that the embodiments shown are only exemplary and that various modifications can be made in construction and practice within the scope of the invention as defined in the appended claims.

We claim as our invention:
1. A prosthetic tricuspid valve comprising
   (a) a valve housing of flexible material having a cylindrical bore therethrough, and
   (b) three leaflets of a thin, pliable and elastic material, each leaflet having two straight edges intersecting at a large obtuse interior angle and two arcuate edges intersecting at a large obtuse interior angle with one of said arcuate edges intersecting one of said straight edges at approximately a right interior angle and the other of said arcuate edges intersecting the other of said straight edges at approximately a right interior angle, each leaflet further having a spheroidal shape, the straight edges of each leaflet making a mating contact with one straight edge of another leaflet, and the arcuate edges of each leaflet integrally joined to said housing in said cylindrical bore.

2. A prosthetic tricuspid valve comprising
   (a) a valve housing of an elastomeric resin mixture having a cylindrical bore therethrough, and
   (b) three leaflets of a thin film of an elastomer, each leaflet having two straight edges intersecting at a large obtuse interior angle and two arcuate edges intersecting at a large obtuse interior angle with one of said arcuate edges intersecting one of said straight edges at approximately a right interior angle and the other of said arcuate edges intersecting the other of said straight edges at approximately a right interior angle, each leaflet further having a spheroidal shape, the straight edges of each leaflet making a mating contact with one straight edge of another leaflet, and the arcuate edges of each leaflet integrally joined to said housing in said cylindrical bore.

3. A leaflet for a prosthetic tricuspid valve comprised of a thin film of a pliable, elastic material and having two smooth, rounded and straight edges intersecting at a large obtuse interior angle and two arcuate edges intersecting at a large obtuse interior angle with one of said arcuate edges intersecting one of said straight edges at approximately a right interior angle and the other of said arcuate edges intersecting the other of said straight edges at approximately a right interior angle.

4. A leaflet for a prosthetic tricuspid valve comprised of a thin film of an elastomer and having two smooth, rounded and straight edges intersecting at a large obtuse interior angle and two arcuate edges intersecting at a large obtuse interior angle with one of said arcuate edges intersecting one of said straight edges at approximately a right interior angle and the other of said arcuate edges intersecting the other of said straight edges at approximately a right interior angle.

References Cited by the Examiner

UNITED STATES PATENTS

| Re. | 682 | 4/1859 | Peale | 137—525.1 |
| 3,197,788 | | 8/1956 | Segger | 137—525.1 |

WILLIAM F. O'DEA, *Primary Examiner.*

H. M. COHN, *Assistant Examiner.*